United States Patent [19]

Kelley et al.

[11] Patent Number: 4,924,158

[45] Date of Patent: May 8, 1990

[54] MOTOR DRIVER PROTECTION CIRCUIT

[75] Inventors: Gerard F. Kelley; Larry R. Hach, both of Kokomo, Ind.

[73] Assignee: General Motors Corporation, Detroit, Mich.

[21] Appl. No.: 332,133

[22] Filed: Apr. 3, 1989

[51] Int. Cl.$^5$ .............................................. H02P 1/22
[52] U.S. Cl. ................................... 318/434; 318/293; 318/452
[58] Field of Search ............... 318/293, 434, 452, 484, 318/599; 361/23, 28, 29

[56] References Cited

U.S. PATENT DOCUMENTS

| | | |
|---|---|---|
| 3,852,656 | 12/1974 | Bourbeau . |
| 4,005,585 | 2/1977 | Matthews ........................ 318/452 X |
| 4,314,186 | 2/1982 | Gille et al. ........................ 318/434 |
| 4,336,562 | 6/1982 | Kotowski . |
| 4,504,881 | 3/1985 | Wada et al. ...................... 318/434 X |
| 4,532,567 | 7/1985 | Kade .............................. 318/434 X |
| 4,562,393 | 12/1985 | Loyzim et al. ..................... 318/599 |
| 4,581,711 | 4/1986 | Hirata et al. ..................... 318/434 X |
| 4,629,951 | 12/1986 | Weber et al. ..................... 318/434 X |
| 4,680,512 | 7/1987 | Melocik .......................... 318/434 X |
| 4,748,386 | 5/1988 | Nakanishi et al. ................. 318/434 X |
| 4,751,442 | 6/1988 | Kurakake ......................... 318/599 X |
| 4,779,031 | 10/1988 | Arends et al. .................... 318/434 X |

Primary Examiner—Bentsu Ro
Attorney, Agent, or Firm—Howard N. Conkey

[57] ABSTRACT

An interface circuit between a microcomputer and a MOSFET driver for motor control includes logic for failsafe motor control particularly to protect the driver. AND gates supply driver signals when a set of conditions are met. Certain conditions are mandated directly by the microcomputer. An analog oscillator and digital counter are used to time data signals from the microcomputer to assure continual computer operation. Other conditions are determined by the logic and include monitoring faulty motor current conditions, assuring that forward and reverse signals are not given concurrently, and assuring that there is a dead time between forward and reverse signals to the driver.

7 Claims, 3 Drawing Sheets

MOTOR DRIVER PROTECTION CIRCUIT

FIELD OF THE INVENTION

This invention relates to motor control protection circuits and particularly to apparatus for fail safe operation of motor driver circuits.

BACKGROUND OF THE INVENTION

It is known to control electrical motor operation by a microcomputer or other controller via an interface which interprets control commands and suitably applies on or off signals to switching circuitry which drives the motor. A useful motor driver capable of forward and reverse operation is an H-bridge which has two arms connected from opposite sides of the motor to the power source and two more arms connected from opposite sides of the motor to ground. Each arm contains a switch such as a power MOSFET or other semiconductor switch so that by selective switch control the motor can be driven in either direction by current flowing from the power source and through the motor to ground.

The control of motor current is carried out by direct pulse width modulation in response to pulsed controller signals so that the average motor current is that desired by the controller r, or by a current value signal from the controller which is compared with a current feedback signal from the driver circuit to regulate the drivers on and off. Throughout all these control operations it is necessary to manage the switching in a manner which avoids damage to the semiconductors and which also avoids damage to the motor. That is, in the case of improper controller signals or faulty motor operation the motor current should be turned off or kept off. Then any switch-currents which are not predictable and within safe limits are prevented or immediately terminated. To assure that requested currents and other commands are correct it is important to have frequent updates from the controller. The absence of such frequent updates suggests that the controller is faulty.

SUMMARY OF THE INVENTION

It is therefore an object of the invention to provide failsafe circuits for motor driver control. It is another object to provide motor driver interface protection circuits.

The invention is carried out in a motor control having a motor driver circuit responsive to commands from a controller and an interface coupling the controller to the driver, the interface having means for protecting the driver comprising: means for detecting commands from the controller, means for gating the commands to the driver, and means for disabling the gating means to turn off the driver when the period between commands exceeds a preset period.

The invention is further carried out in such an interface wherein gating means are controlled by forward and reverse validation circuits, motor fault detection, current regulation signals and zero current operation forced by controller command.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figure 1:
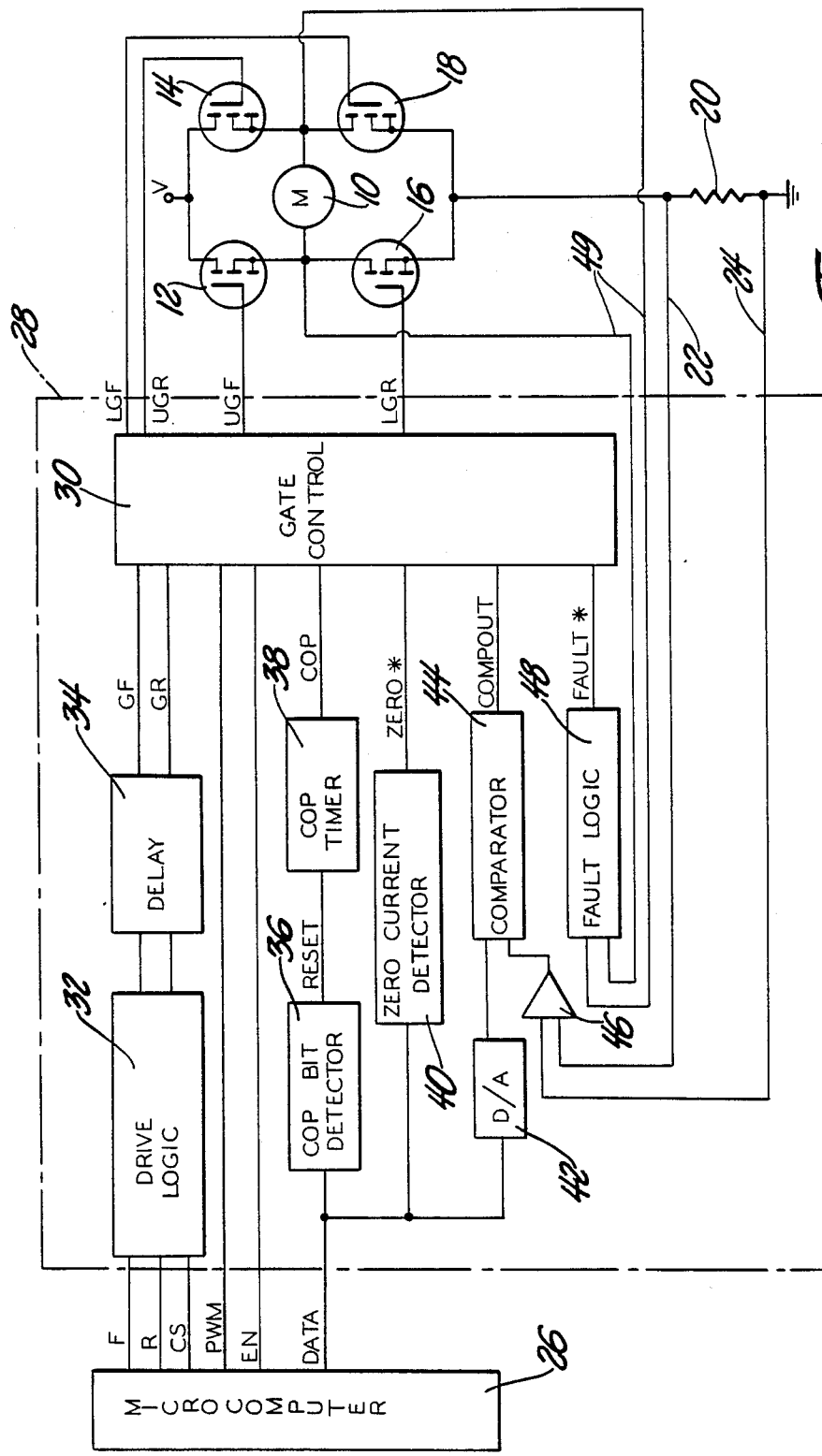
FIG. 1 is a block diagram of a motor control system having protection circuits according to the invention.

The system of FIG. 1 drives a motor 10 in either direction by an H-bridge comprising upper arms containing MOSFETs 12 and 14 connected between a voltage source V and opposite sides of the motor, and lower arms containing MOSFETs 16 and 18 connected between opposite sides of the motor and ground via a current sensing resistor 20. The gates of MOSFETs 12 and 18 are turned on by signals UGF (upper gate forward) and LGF (lower gate forward), respectively, to allow current flow through the motor in the forward rotation direction. The two gates are controlled independently so that the lower MOSFET can be turned off to terminate current flow from the source and the upper MOSFET can remain on for a while to allow the induced motor recirculation current to continue. For reverse motor energization, the gates of MOSFET 14 and 16 are turned on by signals UGR (upper gate reverse) and LGR (lower gate reverse). The motor energization current in either case flows through the resistor 20 which develops a proportional voltage on lines 22 and 24 which feed back to the motor driver interface.

The system is controlled by a microcomputer or controller 26. The remainder of the circuits of FIG. 1 comprise the motor driver interface 28 which is preferably contained on an integrated circuit chip. The microcomputer can control several interface chips and associated motors although only one is shown in the drawings. A chip select line dedicated to each interface chip is used to activate each chip. Other control lines are shared among the several chips. The interface interprets the signals received from the microcomputer 26 to control the H-bridge driver and to protect the motor and driver from harmful conditions. A gate control 30 responds to several inputs and issues the output gate control signals LGF, UGF, UGR and LGR. Two control signals from the microcomputer PWM and EN are coupled directly to the gate control 30. The EN signal enables the gate control and must always be present before the gate control signals are emitted. The PWM signal must be present for the lower gate control signals to be on and is used to directly control pulse width modulation of the motor current by the microcomputer 26 if that mode of operation is desired. Otherwise the PWM signal is held on to permit the lower gates to be controlled by another circuit. Signals F (forward), R (reverse) and CS (chip select) from the microcomputer are coupled to a drive logic circuit 32 which, in turn, is coupled through a delay circuit 34 to the gate control 30.

The DATA signal from the microcomputer is an 8-bit data word: one bit is a COP (continuous operation) bit and the other 7 bits are a command value which determines motor current. A COP bit detector 36 monitors the COP bit and a COP timer circuit 38 determines whether the DATA signal is issued on a regular basis and outputs a COP signal to the gate control 30. A zero current detector 40 decodes the 7-bit command value and provides a ZERO* signal to the gate control if the current command is not zero. (The asterisk is used in the text to indicate the complement of a signal.) If the command value is zero the ZERO* output is at a logic low value to turn off the lower MOSFETs of the driver bridge. The 7-bit command value is changed to an analog voltage by a D/A converter 42 and is input to a comparator 44. The current feedback signal on lines 22 and 24 is coupled through a differential amplifier 46 to the other input of the comparator 44 which produces an output COMPOUT which is effective to turn the lower MOSFETs on and off to regulate the average current to the command value. A fault logic circuit 48 monitors the voltage across the motor 10 via lines 49 and analyzes the voltage on those lines to determine a short to v, a short to ground, a short load or an open load. When any of those occur, the FAULT* output is low and all the gates are disabled. Normally that output is high.

Figure 2:
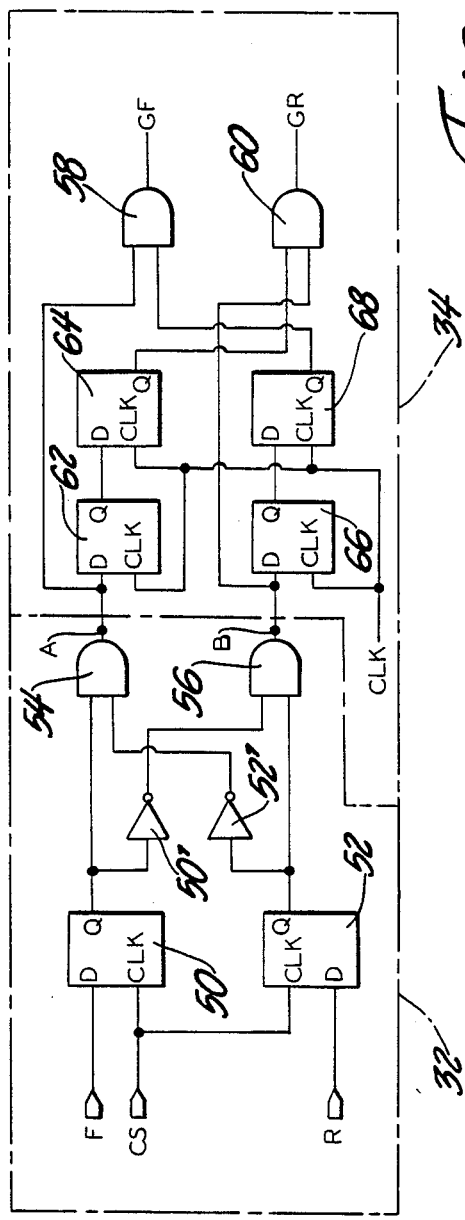
FIG. 2 is a schematic diagram of the drive logic and delay circuits of FIG. 1.

The purpose of the drive logic circuit 32 is to validate the F and R direction signals by insuring that no action is taken if both signals are high. As shown in FIG. 2, the drive logic circuit 32 has two flip/flops 50 and 52, each having an output connected to an AND gate 54 and 56. A pair of inverters 50' and 52' cross-connect the outputs and gates. The signals F and R are connected to the data inputs of the flip/flops 50 and 52 and the CS signal is connected to the clock inputs of both flip/flops. When the CS signal first goes to its high state the data inputs of the flip/flops 50 and 52 are latched to the outputs and thus go to the respective AND gates 54 and 56. If the F input is high and R is low, both inputs of gate 54 will be high since the low R signal will cause the inverter 52' output to be high. Then the output of AND gate 54 at node A will be high. Similarly, if the R input is high and F is low, the output of AND gate 56 at node B will be high. If both F and R signals are high, however, both inverters will have low outputs to disable both gates 54 and 56 and prevent any direction signals from being transmitted.

The time delay circuit 34 further validates the output of the logic circuit by requiring that the direction signals remain constant for a certain time before the gate control can be activated. The time delay circuit 34 comprises a two stage shift register and an AND gate for each input. The A input at the output of gate 54 is coupled to an AND gate 58 and the B input is coupled to an AND gate 60. The A input is also connected to the data input of a flip/flop 62, the output of which is coupled to the input of a flip/flop 64. The complementary output of flip/flop 64 is coupled to an input of gate 60. Similarly, the stages 66 and 68 couple the complement of the B input to the gate 58. A clock signal supplied by the microcomputer is divided to provide a delay clock signal which is fed to the clock inputs of each of the flip/flops 62-68 so that two clock periods are required to step the data through the registers. Thus if the A input is high and the B input is low, the AND gate 58 output GF (gated forward) will be high and the other output GR will be low after two clock cycles have elapsed. If the A and B inputs each change state, the GF signal will go low immediately but the GR signal will not change unless those inputs remain in the new state for two clock cycles. This circuit ensures a dead time when switching between forward and reverse and prevents the forward and reverse MOSFETs from conducting at the same time which would destroy the MOSFETs. The use of a digital time delay provides an accurate dead time period that does not fluctuate with temperature, voltage and process variations.

The operation of the motor is predicated on the continuing control of the microcomputer which normally completes a control loop and issues a data word once each 10 milliseconds. The COP bit changes state in each control loop. The COP bit detector 36 monitors the COP bit and issues a RESET pulse each time the bit changes to a high state. The COP timer 38 has a preset timer which starts at each RESET pulse. If the timer times out before receiving another RESET pulse the COP signal goes low, indicating an irregularity in the microcomputer operation, and serves to disable the motor driver.

Figure 3:
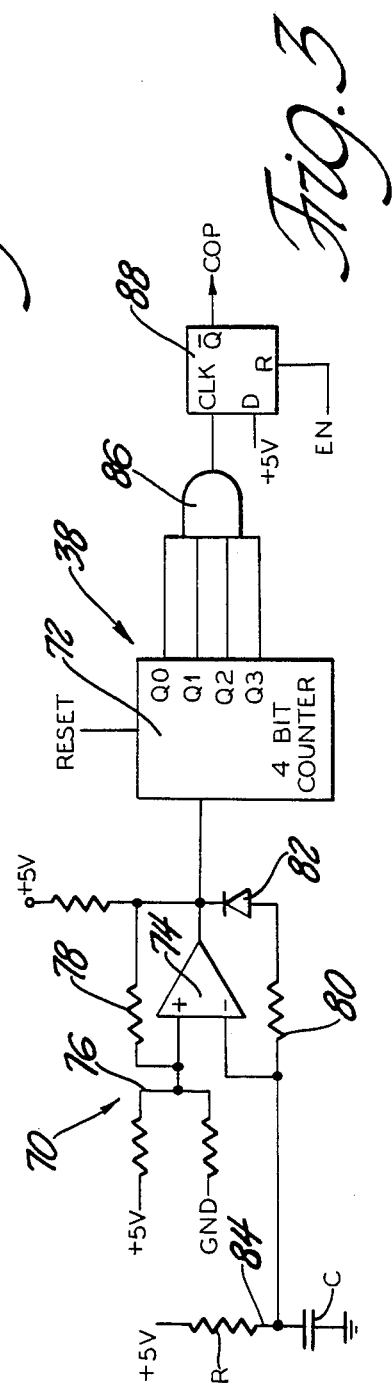
FIG. 3 is a schematic diagram of the COP timer of FIG. 1.

As shown in FIG. 3, the timer 38 comprises an analog oscillator 70 which produces pulses at a regular preset frequency, and a digital counter 72 which counts the pulses. The oscillator 70 uses a comparator 74 to oscillate between two thresholds determined by a resistor divider 76 connected to the positive input of the comparator and by feedback values. A feed back resistor 78 is connected between the positive input and the output while a resistor 80 and serial diode 82 are connected between the negative input and the output. An externally mounted RC circuit 84 is connected between 5v and ground and its junction point is connected to the negative input of the comparator. When the capacitor C charges up above the value of the voltage divider by a hysteresis amount the comparator turns off to discharge the capacitor through the diode 82. When the capacitor voltage falls to a point determined by hysteresis the comparator again turns on to repeat the process. The counter 72 is a 4-bit counter having all four outputs connected to an AND gate 86. At a count of 15 all counter outputs will go to the high state. The output of the gate 86 is coupled to the clock input of a flip/flop 88 which has its data input tied to 5v. The Q* terminal which provides the COP signal latches to a low state when the AND gate 86 goes high. The COP signal remains low until reset by a RESET signal generated at the rising edge of the EN signal. As long as the counter 72 is reset by a RESET signal before reaching a count of 15 the COP signal will not go low. If the oscillator has a period of, say, 3.5 ms, the counter will require 52.5 ms to count out. The RESET signal will normally be produced each 20 ms. Thus a failure to reset the counter within 52.5 ms is cause for caution and the motor is turned off as a failsafe measure.

Figure 4:
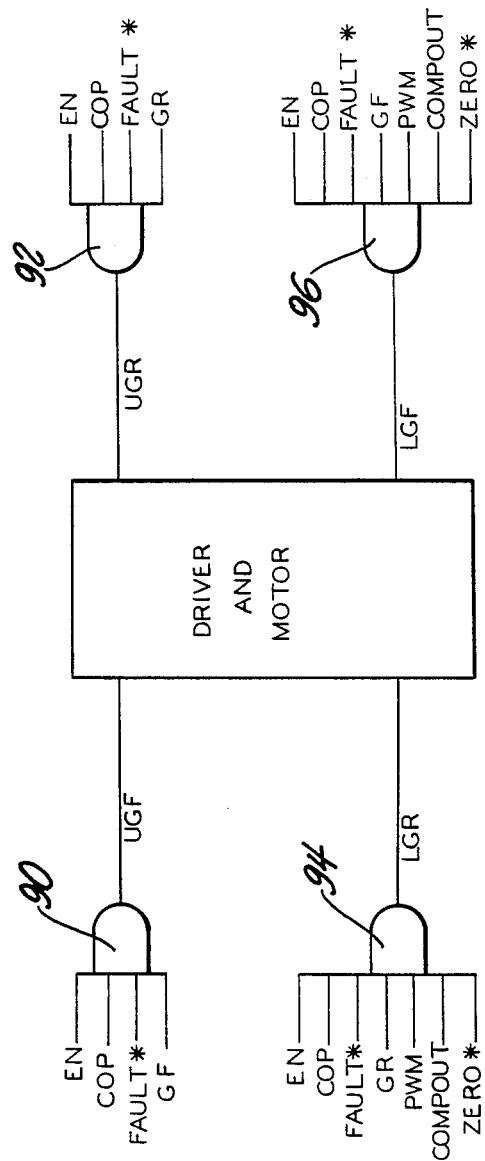
FIG. 4 is a diagram of the gate control of FIG. 1.

The COP timer 38 utilizes both analog and digital circuitry to maximize performance and minimize cost. By using both analog and digital circuitry the external capacitor C can have a smaller value which reduces its physical size and also the cost. An all analog design would require a larger capacitor which is more costly and takes up more circuit board space An all digital design would require a significant divider from the system clock requiring considerable silicon. The mixed design also allows the RC circuit to be modified to suit a broad range of applications Referring to FIG. 4, the gate control 30 comprises four AND gates 90-96 each of which, when energized, outputs a gate control signal to the H-bridge driver. The three basic protective signals EN, COP, and FAULT* are input to each of the AND gates along with a directional (GF or GR) signal. AND gates 90 and 92 which produce the UGF and UGR signals respectively have no other inputs. The lower MOSFETs control current magnitude and require additional inputs. Thus the signal PWM, COMPOUT and ZERO* ar Ⓡinputs to both the AND gates 94 and 96. With this arrangement the motor driver circuit is protected by switching off all the gates 90–96 when the EN signal is removed or the COP or FAULT* signal goes low in response to lack of regular computer updating or to irregular motor current conditions. The directional signals assure that only one path at a time is closed between the power source and the motor and that a dead time is provided when the motor direction is changed. The lower MOSFETs are controlled by AND gates 94 and 96 to establish the proper current modulation either in response to PWM or COMPOUT depending on whether the microcomputer requires direct control of pulse width modulation or regulation by feedback control, and they also assure no current flow when a zero current is mandated by the DATA command value.

The foregoing description of a preferred embodiment of the invention for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. In a motor control having a motor driver circuit responsive to commands from a controller and an interface coupling the controller to the motor driver circuit, the interface having means for protecting the driver circuit, the interface comprising:
   means for detecting the commands from the controller,
   forward and reverse gating means for gating the commands to the motor driver circuit,
   means for disabling the gating means to turn off the motor driver circuit when the period between commands exceeds a preset period, and
   logic means for receiving forward and reverse direction signals from the controller and for passing each of the forward and reverse signals to the respective forward and reverse gating means only when one of the signals is at a logic high and the other of the signals is at a logic low, so that invalid direction signals are ineffective to cause the motor driver circuit operation.

2. The invention as defined in claim 1 further including means for ensuring a dead time upon a change of direction signals comprising a digital time delay at the output of the said logic means for inhibiting either direction signal until the other direction signal has remained at a logic low for the duration of the delay.

3. In a motor control having forward and reverse motor drivers responsive to commands from a controller and an interface coupling the controller to the drivers, the controller generating an enable output and the interface having means for protecting the drivers, the interface comprising:
   means for detecting the commands from the controller and producing an output when the period between commands is within a preset period,
   first and second gating means for gating the commands to the forward and reverse drivers, respectively,
   means responsive to forward and reverse signals from the controller for issuing a valid direction output to the first and second gating means respectively,
   means responsive to driver current for determining a fault condition and producing an output in the absence of a fault, and
   means for disabling any gating means in the absence of any of said outputs to provide directional control and to provide fail-safe driver operation.

4. The invention as defined in claim 3 further including means responsive to the driver current and to current control commands from the controller for disabling selected gates of the gating means when a smaller current or no current is desired.

5. The invention as defined in claim 3 further including means responsive to the commands from the controller for regulating the driver current and for producing a first current output when the current falls below a commanded value,
   means responsive to the commands from the controller for producing a second current output only when the command value is for a current greater than zero current, and
   means for applying the current outputs to selected gates of the gating means whereby the selected gates are disabled when the driver current is greater than commanded current and when the command value is for zero current.

6. A controller for a motor comprising, in combination:
   a motor driver for driving the motor;
   a computer for executing a control loop and issuing a data word once during each of successive equal loop time intervals, each data word having a COP (continuous operation) bit and a number of bits establishing a motor command value;
   means for generating a command signal in accord with the motor command value established by the number of bits in the data word;
   timing means for (A) timing the period between COP bits in successive data words and (B) producing a disable signal representing an irregularity in operation of the computer when the timed period exceeds a predetermined constant period that is greater than the loop time interval; and
   gating means coupled to the timing means for (A) gating the command signal to the motor driver in the absence of the disable signal and (B) blocking the command signal while the disable signal is produced, whereby the motor driver is inhibited during the irregularity in operation of the computer when the timed period between COP bits is greater than the predetermined constant period.

7. The controller set forth in claim 6 wherein the timing means comprises:
   an analog oscillator producing pulses at a set frequency, the analog oscillator including a capacitor for establishing the set frequency;
   a digital counter for (A) counting the oscillator pulses and (B) producing the disable signal when the count reaches a set value; and
   means for detecting the COP bit and resetting the count of the digital counter in response to a detected COP bit.

* * * * *